Sept. 2, 1924.

L. W. BUGBEE 1,506,733

PROCESS OF MAKING MULTIFOCAL LENSES

Filed Jan. 13, 1923

INVENTOR.
LUCIAN W. BUGBEE.
BY
ATTORNEYS.

Patented Sept. 2, 1924.

1,506,733

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

PROCESS OF MAKING MULTIFOCAL LENSES.

Application filed January 13, 1923. Serial No. 612,474.

*To all whom it may concern:*

Be it known that I, LUCIAN W. BUGBEE, a citizen of the United States, and a resident of Indianapolis, county of Marion and State of Indiana, have invented a certain new and useful Process of Making Multifocal Lenses; and I do hereby declare that the following is a full, clear, and exact description thereof, reference being had to the accompanying drawings, in which like numerals refer to like parts.

The object of this invention is to improve the process of making multifocal lenses when it is desired to grind or generate a visual surface or field of a lens after the remaining portion of the lens has been ground so that said added field will have the desired curvature and the exact conformation with reference to the remaining field or fields of the lens. Another object of the invention is to make such lens easily, economically and accuately.

The invention herein may be employed in making bifocal, trifocal or other multifocal lenses and either where the same are made of one piece of glass or two pieces of glass secured together by fusion the same as in Kryptok lenses, or otherwise. The invention, however, is particularly designed for the practical manufacture of trifocal lenses.

This process enables one to successfully generate, in making any of the kinds of lenses above enumerated, an added field which is either weaker or stronger than the other segments or surface previously generated.

The chief feature of the invention consists in coating the previously generated field or fields of the lens blank with shellac or other adhesive, and securing thereto a counter piece of glass near the side thereof opposite the portion of the blank which is to be ground away to form the additional field. Such counter piece of glass is preferably located at substantially the same distance from the center of the blank and the field to be ground or added. Then it is ground by a single surface tool or lap until the desired field has been ground.

The process herein enables the blank to be accurately balanced on the tool or lap during said grinding, so that the counter piece and new field of the blank will receive equal pressure from the tool. It enables one to give to said added field the exact curvature and dimensions desired and the proper location relative to the previously formed field or fields, and said previously formed fields are protected from harm while this process is being carried out.

Figure 1:
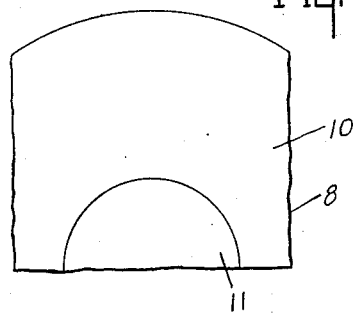
Figure 2:
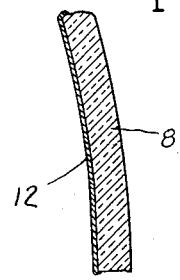
Figure 3:
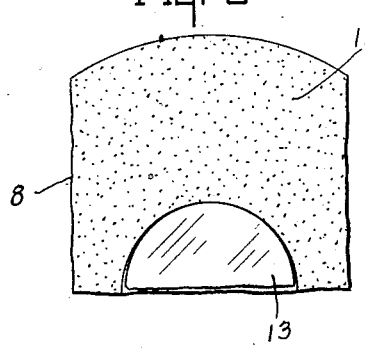
Figure 5:
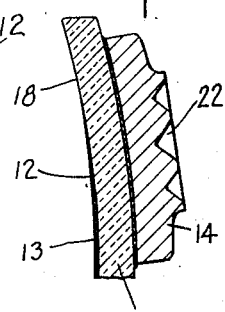
Figure 6:
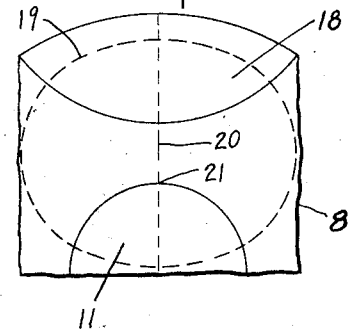
Figure 7:
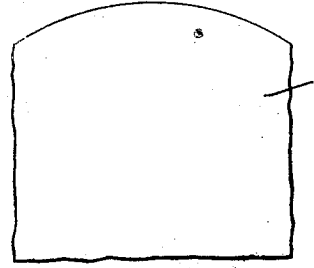
Figure 4:
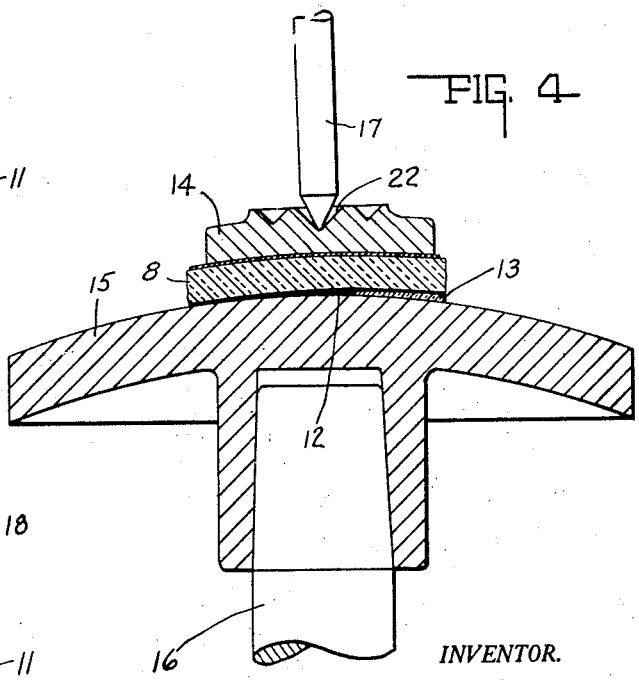
Figure 8:
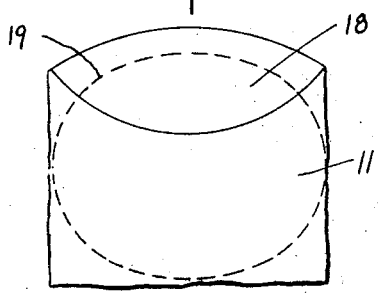

The full nature of the invention will be understood from the accompanying drawings and the following description and claims:

In the drawings, Figure 1 is a plan view of a finished bifocal lens blank with the near field at the lower part thereof and what may be termed the distant field above. Fig. 2 is the same blank coated with shellac. Fig. 3 is a plan view of what is shown in Fig. 2, with the counterpiece in place. Fig. 4 is a central vertical section through the grinding tool or lap and the blank as shown in Fig. 3 and means for holding the blank holder and blank in cooperation with the tool, the parts being shown in condition at the beginning of the grinding operation. Fig. 5 is a central vertical section through the blank and blank holder after the grinding has been finished. Fig. 6 is a plan view of the finished blank showing trifocal surfaces, the finished lens being outlined by a dotted line. Fig. 7 is the same as Fig. 1, showing a single surface blank. Fig. 8 is a plan view of a finished bifocal blank made from the blank shown in Fig. 7.

In the first place a glass blank has ground or generated on one side thereof one or more fields having the desired curvature or focal power. In Fig. 1 there is shown a bifocal blank 8 in which the major field 10 is, say, −6 dioptrics, suitable for distance vision, and the field 11 is stronger, say, −4 dioptrics, suitable for near vision or reading. This blank is common in the art of making bifocal lenses. This invention, however, applies equally whether the blank has been finished on one side to have one visual surface or two or more fields, prior to adding the additional field for which the process constituting this invention is designed and employed.

The next step in the process is to coat the finished fields 10 and 11 with leaf shellac 12 or other suitable adhesive. The leaf shellac is melted and the blank covered with it, as shown in Fig. 2. This protects the previously generated bifocal field or fields from injury while this process is being carried out.

In the third place a counter piece of glass 13 is formed of a relatively thin piece of glass and preferably of the area and form substantially like that of the field to be ground or generated by this process.

In the next step said counter piece of glass is embedded in the shellac 12 and secured to the lens blank at the side of the center of the blank opposite the portion of the blank that is to be ground away by this process and about equal distance from the desired position of the additional field. The position of the counter piece of glass 13 is shown in Figs. 3 and 4.

Then the lens blank is secured in the usual manner on a lens holder 14 and the same placed on a grinding tool or lap 15 of a single curvature and which may be of the common type, such as shown in Fig. 4. Its curvature is such as to enable it to grind in the lens blank an additional field of the desired curvature. The tool 15 is secured on a shaft 16 and the lens blank and lens holder are held in place by a pin 17 and moved back and forth on the tool as it rotates. The particular kind of tool or lap or grinding means or means for holding or operating the lens holder herein shown is immaterial to this invention, as any other well known means for holding and grinding lenses may be employed.

As the grinding proceeds, it is obvious from Fig. 4 that the shellac will be immediately ground away and then the left-hand edge of the blank will come in contact with the lap or tool and it will be ground and at the same time also the counter piece of glass 13. The blank will be balanced on the tool because the portion of the blank being ground is on the opposite side of the center of the lens blank and holder from the counter piece of glass 13. This grinding is continued until an additional field of the desired size has been generated in the portion of the lens blank opposite the counter piece, as shown in Fig. 4, and it will have the curvature corresponding to the surface of the lap, say, —7 dioptrics. The additional field thus ground is marked 18 in Figs. 5 and 6.

After the grinding is thus finished, the surface of the blank is as shown in Fig. 5. The upper field 18 is the newly ground field. At the lower portion there is the remainder of the counter piece of glass 13 and in between the parts 13 and 18 is a thin layer of shellac which has not been entirely ground away. The edge of the counter piece 13 should coincide with the edge of the lower field 11 on the center line 20 through the blank. The point 21 at the intersection of the line between the reading and intermediate fields, and the meridian line can be used to measure from to determine, according to the prescription, where to stop grinding the new field 18. This gap should be about 12 m. m. and at least more than 5 m. m. wide or wider than the pupil of the eye.

After the grinding has been finished of the blank in Figs. 1 to 5, it is polished in the usual manner, and then it will appear as in Fig. 6, showing the trifocal with the division lines of the upper and lower fields being curved in opposite directions and substantially equal distances from the center of the lens. This completes the blank. It is afterwards cut away on the dotted line 19 and suitably finished on the back or prescription side and this makes the completed lens.

One of the important features of this process is the ability to balance such a lens blank on the tool, for otherwise it is very difficulty to handle such a blank or grind a field of the proper size and desired curvature and at the proper position. The counter piece should preferably be thin and with the curvature corresponding with the lap or tool employed in order to obtain the best results. The lens blank holder has a plurality of conical recesses 22 in it, as shown in Fig. 5, so that if the counter piece of glass grinds too slowly, the pin 17 can be inserted in a recess 22 away from the center of the blank holder on the side where the counter piece of glass is secured so that there will be more pressure on the counter piece of glass than on the lens blank. This eccentric holding cannot, however, be employed in the final stage of the grinding, for then the pin 17 must be centrally located, as in Fig. 4, in order to form a truly spherical surface.

The additional field 18 that is ground by this process may be either stronger or weaker than the other field or fields, as desired. This is determined by the lap or tool 15. If the upper field 18 be weaker than the intermediate field 10, say —7 dioptrics, the fields would be gradually weaker from the bottom to the top, which would be the most usual character of trifocal. However, a strong upper field is desired in some kinds of uses. The old type of whole bifocal having only two fields, the minor field being the upper and weaker one, can be made by this process, if desired. In that case one starts with a single surface blank instead of a bifocal blank and then grinds off a weaker field in the upper part thereof by the process herein set forth. Whether the blank is a Kryptok blank or a onepiece bifocal blank is immaterial in the use of this process. While in this specification, the generation of the upper field has been described, the added field need not be at the upper part of the lens. It can be at the lower part of the lens.

The first five figures illustrate the method and means for making trifocal lenses. In Fig. 7 there is shown a blank 10 similar to that in Fig. 1, excepting it has only a single surface, say —4 dioptrics suitable for reading. After it has been treated in the manner herein described for treating the blank shown in Fig. 1, a bifocal blank is produced, as shown in Fig. 8, of an old type often called the old whole bifocal lens, wherein the major surface 11 is the reading field and the upper minor surface is the distance field.

The invention claimed is:

1. The process of making a multifocal lens, which process includes forming on one side of a lens blank one or more fields as desired, securing a counter piece of glass to the portion of the blank opposite to the portion upon which the desired additional field is to be generated, and grinding said additional field with a tool of the required curvature of the new field which overlaps both the counterpiece and additional field, whereby the blank will be balanced on the tool by the counterpiece during the operation.

2. The process of making a multifocal lens, which process includes forming on one side of the lens blank one or more fields as desired, coating the finished surface of the lens blank with adhesive material, securing a counter piece of glass by the adhesive material to the portion of the blank opposite to the portion upon which the desired additional field is to be generated, and grinding said additional field with a tool of the required curvature which overlaps and engages both the counterpiece and additional field, whereby the tool and blank will be maintained in balanced relation by the counterpiece during the operation.

3. The process of making a multifocal lens, which process includes coating the finished surface of a lens blank with shellac and the like, securing a counter piece of glass by the shellac to the portion of the blank opposite to the portion upon which the desired additional field is to be generated, said counter piece having substantially the same form and curvature as the surface to be ground, and grinding said additional field with a tool of the required curvature which overlaps and grinds both the counterpiece and additional field.

In witness whereof, I have hereunto affixed my signature.

LUCIAN W. BUGBEE.